US000001352H

United States Statutory Invention Registration [19]

[11] Reg. Number: H1352

Bundy et al.

[43] Published: Sep. 6, 1994

[54] COMBUSTIBLE METALLIC PROPELLANT CHARGE IGNITER

[75] Inventors: Mark L. Bundy, Belcamp; Frederick W. Robbins, Havre De Grace; Lawrence E. Sturla, Baltimore, all of Md.

[73] Assignee: The United States of America as represented by the Secretary of the Army, Washington, D.C.

[21] Appl. No.: 955,188

[22] Filed: Oct. 1, 1992

[51] Int. Cl.[5] ..... F42C 19/08

[52] U.S. Cl. ..... 102/202; 102/205; 102/470

[58] Field of Search ..... 102/202, 205, 430–433, 102/464, 466, 467, 469, 470, 700

[56] References Cited

U.S. PATENT DOCUMENTS

| | | | |
|---|---|---|---|
| 398,823 | 3/1889 | Emmens | 102/470 |
| 4,763,577 | 8/1988 | Romer et al. | 102/431 |
| 5,052,302 | 10/1991 | Taddeo et al. | 102/470 |

FOREIGN PATENT DOCUMENTS

| | | | |
|---|---|---|---|
| 463904 | 1/1992 | European Pat. Off. | 102/467 |

OTHER PUBLICATIONS

Robbins, et al., "Combustible Metallic Igniter Casing For Tank Guns," BRL —MR-3944 (Nov. 1991).

Robbins, et al., "Combustible Metallic High Pressure Igniter Casing," 27th JANNAF Combustion Subcommittee Meeting, CPIA Publ. 557 (1990).

*Primary Examiner*—Harold J. Tudor

*Attorney, Agent, or Firm*—Freda L. Krosnick; Jason Shapiro; Muzio R. Roberto

[57] ABSTRACT

A propellant charge igniter is provided with a metallic igniter tube which is consumed along with the main propellant charge. The combustible igniter tube is flexibly attached to a conventional primer head. An elastomeric tube, a springreinforced tube, or a tube impregnated with a wire mesh can be used to achieve a flexible connection. These tubular elements may be bonded to the primer head and igniter tube, or mechanically attached by means of threaded couplings which are crimped over the elastomeric tubing.

9 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COMBUSTIBLE METALLIC PROPELLANT CHARGE IGNITER

GOVERNMENTAL INTEREST

The invention described herein may be manufactured, used and licensed by or for the U.S. Government for governmental purposes without the payment to us of any royalties thereon.

BACKGROUND OF THE INVENTION

The present invention relates to a propellant charge igniter for tank ammunition. More particularly, the present invention relates to a propellant charge igniter for tank ammunition with a combustible metallic igniter tube and a flexible coupling between ignition elements Conventional high-pressure igniter tubes for tank cannon ammunition are typically made from steel. They are used to contain combustible materials such as benite, which is a mixture of black powder and nitrocellulose. The igniter tube itself is provided with vent holes along its length, and is usually threaded into a primer head assembly which is capable of transmitting energy (i.e. pressure and/or temperature) into the combustible mixture of materials contained within the igniter tube. When the energy induced is sufficient to cause combustion of these materials, an intense flame is produced which issues from the vent holes and into the main propellant charge. The intensity of the flame produced is critical to a rapid ignition of the main propellant charge, and is related to the ability of the igniter tube to contain the combustible material and products of combustion at high pressures (approximately 25–35 MPa).

A rapid and uniform ignition of the main propellant charge is important since it minimizes the time delay between target acquisition and actual launching of a projectile. If the time delay is excessive, the muzzle aim point may no longer coincide with the position of a moving target. Thus, an igniter casing capable of withstanding the high gas pressure of a benite-like material will help improve the performance of the tank gun. Steel igniter tubes are currently used for this reason.

Nevertheless, combustible, low-pressure, cardboard-like igniter tubes containing black powder have been used. These tubes split as the internal pressure rises, and burn along with their combustible contents. Somewhat after these events, the main propellant charge is ignited. As a result, this ignition sequence is several times slower, and less desirable, than the high-pressure benite system previously described Some high-pressure propellant charge igniters with steel igniter tubes are deployed in combustible external shell casings, which are less rigid than their non-combustible counterparts. As a result, mishandling of such a round can result in stress cracks near the base of the igniter tube, where it joins the primer head assembly. In a high pressure ignition system it is likely that the main charge will then be ignited at the site of the igniter tube fracture, near the base of the round. This in turn can lead to an ignition process whereby the propellant bed is pushed forward, creating a stress wave that is strong enough to break the propellant grains (or sticks) into small pieces (e.g. when the propellant is cold).

A pulverized propellant bed has more surface area for burning, and will therefore yield a shorter duration but higher maximum pressure than if the propellant was unfractured. A sharp pressure rise such as this can crack the barrel or even "blow" the breech. In fact, this was suspected to be the cause of at least one accident several years ago. Attempts have been made to solve this problem by reinforcing the joint between the primer head assembly and the igniter tube.

There are, however, other problems associated with conventional high-pressure ignition systems. These include the hazards and space requirements associated with storing spent casings. The hazards arise out of the steel igniter tubes which protrude from spent casings ejected from the gun. These steel igniter tubes are largely intact and extremely hot. In the confines of a tank, spent casings must be stored in close proximity to the crew, increasing the likelihood that a crew member will come into contact with a hot steel tube. In addition, because of their size, only a small number of casings can be stored before firing must be stopped and the cabin cleared.

SUMMARY OF THE INVENTION

Accordingly, it is an object of the present invention to provide a propellant charge igniter for tank ammunition which reduces the possibility of injury caused by expulsion of spent casings having hot igniter tubes.

It is another object of the present invention to provide a propellant charge igniter for tank ammunition in which the igniter tube is consumed along with its contents thereby reducing the possibility of injury caused by expulsion of spent casings.

Another object of the present invention is to provide a propellant charge igniter for tank ammunition which is combustible yet strong enough to contain the high gas pressure produced by an internal igniter charge.

It is still another object of the present invention to provide a propellant charge igniter for tank ammunition provided with a consumable igniter tube which is not susceptible to premature failure or misfire as a result of mishandling.

These objects and others not specifically enumerated are accomplished with a propellant charge igniter having a metallic igniter tube which is combustible and flexibly attached to a conventional primer head. The flexible attachment may be an elastomeric tube, a spring-reinforced tube, or a tube impregnated with a wire mesh. The flexible element may be bonded and/or mechanically attached to the primer head and igniter tube.

BRIEF DESCRIPTION OF THE DRAWINGS

The preferred embodiments of the present invention will be described with reference to the accompanying drawings in which.

DESCRIPTION OF THE PREFERRED EMBODIMENTS

Figure 1:
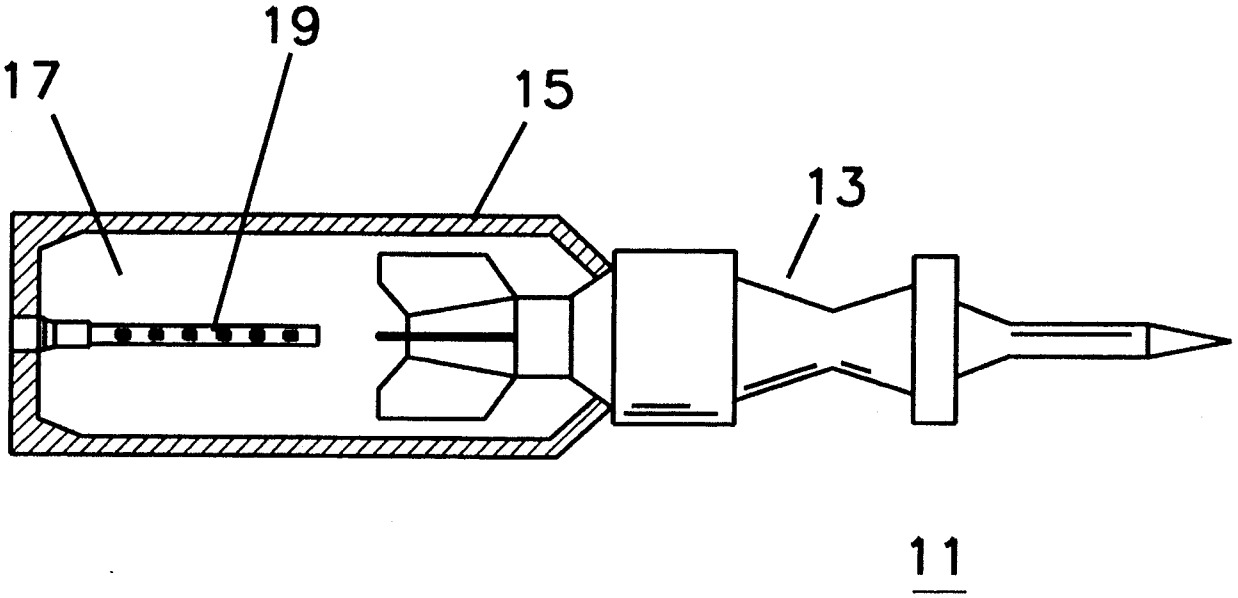
FIG. 1 is a cross-sectional view of a tank shell employing a propellant charge igniter according to the present invention.

Turning now to FIG. 1, a typical 120-mm round of tank gun ammunition 11 is shown employing a propellant charge igniter 19 according to the present invention. The tank cartridge 11 carries a kinetic energy (KE) projectile 13, such as the 120-mm M829A1 KE round currently used by the military. The cartridge casing 15 is a combustible type well known in the art. A conventional propellant charge 17 is held within the cartridge casing 15 behind the projectile 13, and around the propellant charge igniter 19.

Figure 2:
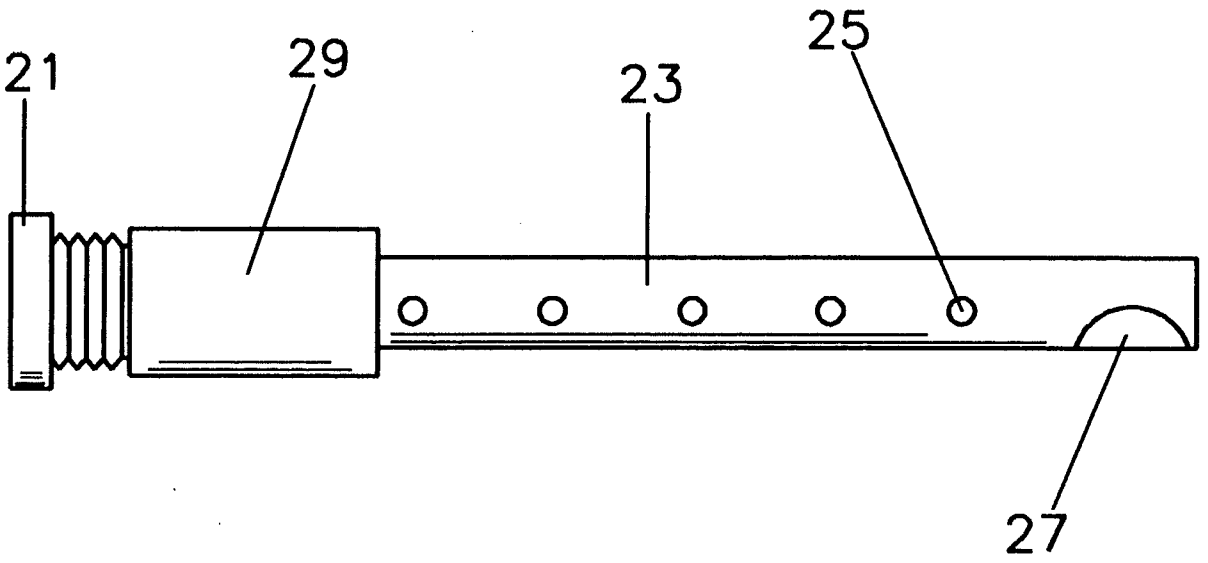
FIG. 2 is a perspective view of a propellant charge igniter according to one embodiment of the present invention.

The component parts of the propellant charge igniter 19 are illustrated in FIG. 2 and include a conventional primer head assembly 21, such as the M125, and a combustible igniter tube 23. The igniter tube 23 is approximately 29 cm long and has an outside diameter of about 17.5 mm. These dimensions are typical of prior art steel igniter tubes used in 120-mm tank ammunition. The igniter tube 23 according to the present invention, however, must be fabricated from a material whose ignition and combustion points are below that of the propellant charge 17 yet higher than the combustible material 27 it contains. The igniter tube material should also be strong enough to contain the gas products associated with the combustion of the enclosed material 27 as it burns. This helps intensify the flame produced by the igniter 19. Aluminum, magnesium, and titanium are all suitable materials for this purpose, although aluminum 7075-T6 is preferred because it is the least expensive, easiest to work with, and softest material of the group. (Magnesium has a tendency to ignite while it is being machined, and titanium is prohibitively expensive as well as notoriously difficult to weld.)

Igniter tubes 23 according to the present invention have been tested with wall thicknesses of between 0.8 mm and 2.2 mm. Thicknesses in this range produced successful ignitions in field tests, although thick-walled aluminum igniter tubes 23 appear to model steel igniter tube performance better.

Wall thickness is one factor which was found to affect ignition delay of the propellant charge 17 Thicker tubes tended to produce shorter delays in tests. Thick-walled aluminum igniter tubes 23 producing delays of about 3.8 ms, compared with delays of over 9 ms produced by thin-walled aluminum igniter tubes 23. Conventional, non-combustible steel igniter tubes produce delays on the order of 4.7 ms under similar conditions.

Like its conventional counterpart, a combustible igniter tube 23 according to the present invention is provided with a plurality of vent holes 25 to provide communication between the combustion material 27, which is held within the igniter tube 23, and the propellant charge 17 Each igniter tube 23 is typically provided with twelve 4.8 mm diameter vent holes 25 which are drilled straight through the igniter tube 23 at 90° intervals 19.1 mm apart. Examination of post-fired propellant charge igniters 19 indicates that the vent holes 25 in thin-walled aluminum igniter tubes 23 tend to breakdown more rapidly which in turn may cause ignition problems and greater ignition delay times.

The aforementioned combustion material 27 is of the conventional type, such as a mixture of black powder and nitrocellulose. This mixture is commonly known as benite, although other mixtures of combustible materials may be used.

It is important that the combustion material 27 be kept in close proximity to the primer head assembly 21 where the igniter tube 13 meets the primer head 21. Prior art igniter tubes were threaded into the primer head, and because they were made of high-strength steel, were both rugged and easily handled. The combustible igniter tube 23 of the present invention is typically less stiff, and is susceptible to damage from rough handling. This is particularly true where the propellant charge igniter 19 is used with a combustible cartridge shell, which is also less rigid.

In order for the combustible igniter tube 23 to return to firing position relative to primer head assembly 21 once it has been displaced, the present invention provides for a flexible attachment 29 which holds the two ignition elements close together while obviating any stress related damage.

Figure 3:
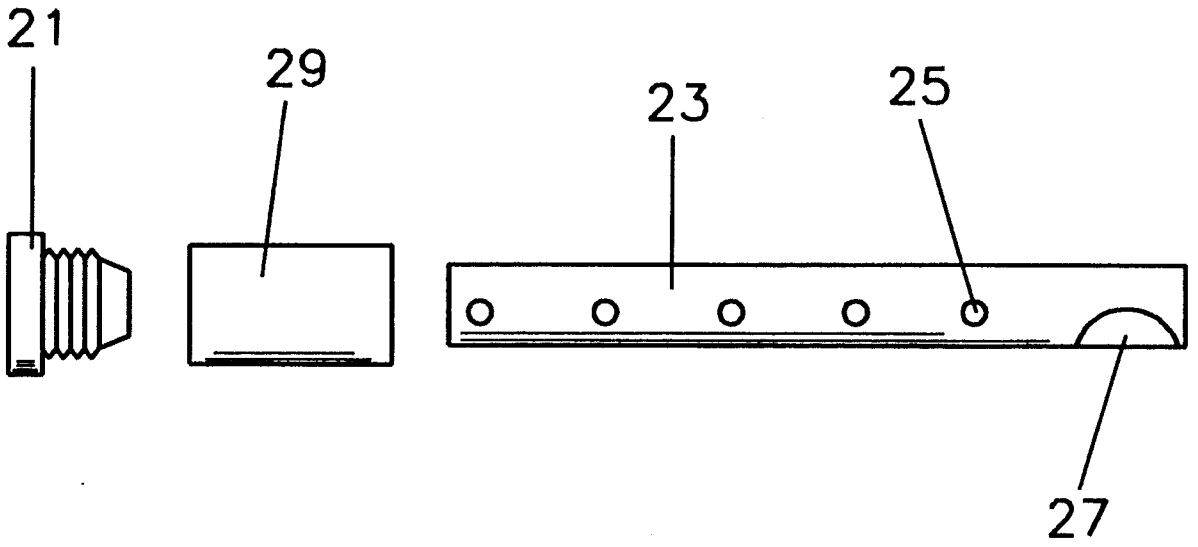
FIG. 3 is a break-away view of the propellant charge igniter shown in FIG. 2.

In a first embodiment, shown in FIGS. 2 and 3, a tubular elastomeric sleeve 29 is attached over abutting ends of the primer head assembly 21 and the igniter tube 23. Industrial rubber or any other resilient material able to withstand extreme temperatures and pressures may be used, although conventional hydraulic hose is preferred because of its availability and low cost.

The elastomeric sleeve 29 may be bonded to the ignition elements or mechanically clamped. If it is bonded, the inner diameter of the sleeve should be such that an appropriate bond-line thickness is maintained. Epoxy cements are preferred for this purpose. Clamping is achieved using crimps alone, or the threaded couplings 35 illustrated in FIG. 6. Of course, a combination of adhesive and mechanical attachment may be used for additional strength. Preliminary results have indicated that premature detachment of the flexible coupling 29 can have deleterious effects on the ignition of the propellant charge 17.

Figure 4:
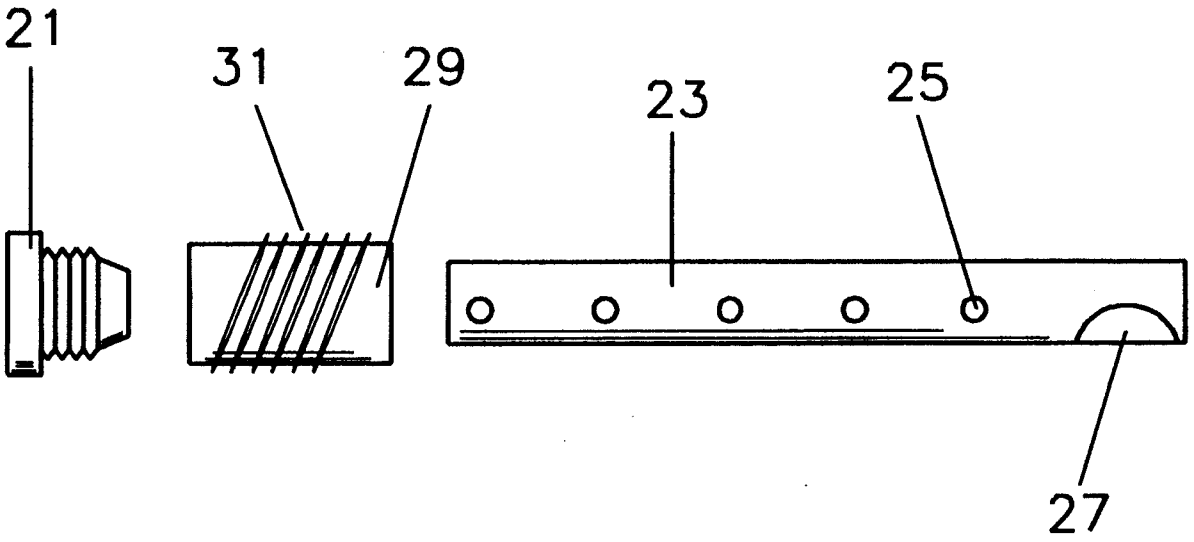
FIG. 4 is a break-away view of a propellant charge igniter in which the primer head and igniter tube are joined by a spring-reinforced elastomeric tube according to another embodiment of the present invention.

A second embodiment is shown in FIG. 4, in which the elastomeric sleeve 29 is reinforced with a spring-like element 31. The spring 31 provides additional radial and axial stiffness to the joint, but allows sufficient flexibility to relieve stresses in the igniter tube 23. This increases reliability by ensuring that the elastomeric sleeve 29 is not driven to its elastic limit and ruptured. It also prevents excessive motion of the igniter tube 23 where more elastic sleeves 29 are used. It is preferred that the spring 31 be adhesively mounted to the sleeve 29 so that uniform reinforcement may be achieved, and for purposes of ruggedness and reliability, a spring steel is preferred.

Figure 5:
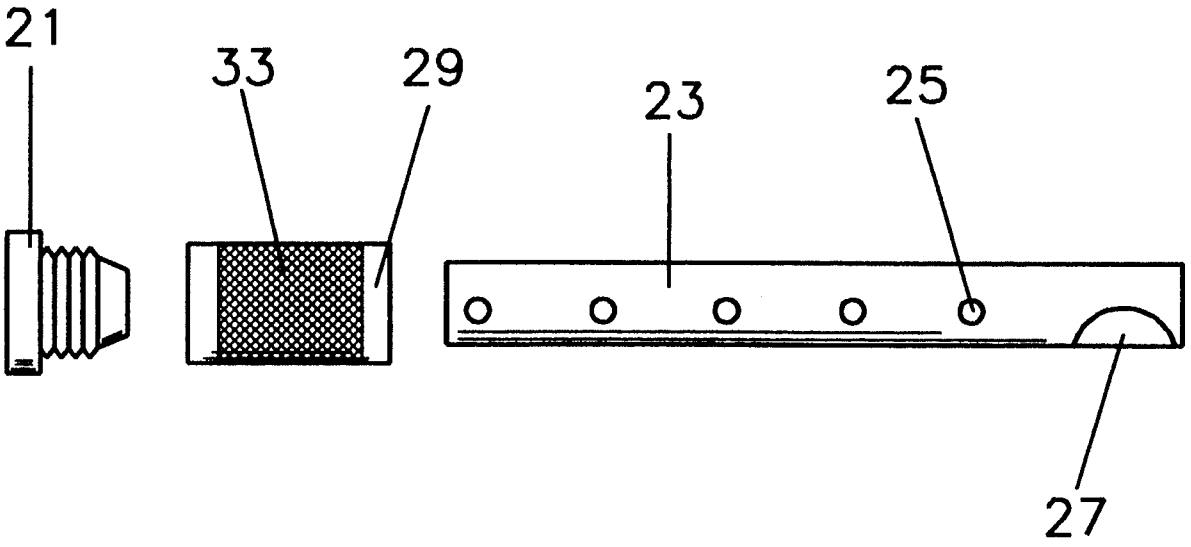
FIG. 5 is a break-away view of a propellant charge igniter according to still another embodiment of the present invention in which the primer head and igniter tube are joined by a wiremesh impregnated elastomeric tube.

In a third embodiment illustrated in FIG. 5, the elastomeric sleeve 29 is reinforced by a wire mesh 33. The wire mesh 33 offers greater axial stiffness in tension, and has the added advantage of being readily available in the form of mesh-reinforced hydraulic hose.

Figure 6:
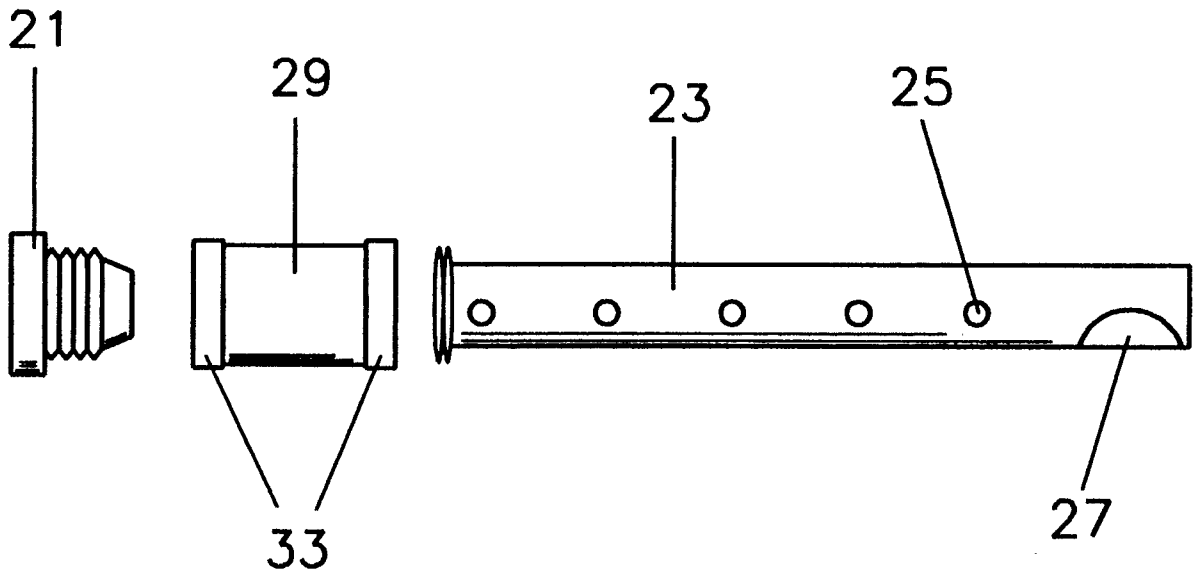
FIG. 6 is a perspective view of a tubular attachment provided with threaded couplings according to yet another embodiment of the present invention.

As mentioned previously, the elastomeric tube 29 may be either bonded or mechanically fastened to the primer head assembly 21 and the igniter tube 23. However, a preferred fastening technique is shown in FIG. 6. Both ends of the elastomeric tube 29 are inserted into steel couplings 35 which are annular in shape and provided with threads to mate into the primer head assembly 21 and the igniter tube 23. The couplings are mechanically crimped to the sleeve 29, which may also be bonded for additional strength.

While there has been described and illustrated specific embodiments of the invention, it will be obvious that various changes, modifications and additions can be made herein without departing from the field of the invention which should be limited only by the scope of the appended claims.

We claim:

1. A propellant charge igniter for tank ammunition, said igniter comprising a primer head, a metallic igniter tube which is combustible and provided with a plurality of vent holes along its length, an igniter charge disposed within said igniter tube, and flexible means for attaching said primer head and igniter tube.

2. A propellant charge igniter for tank ammunition, said igniter comprising a primer head, a metallic igniter tube which is combustible and provided with a plurality of vent holes along its length, an igniter charge disposed within said igniter tube, and flexible means for attaching said primer head and igniter tube, wherein said attachment means comprises an elastomeric tube which is disposed between and attached to said primer head and igniter tube.

3. A propellant charge igniter for tank ammunition, said igniter comprising a primer head, a metallic igniter tube which is combustible and provided with a plurality of vent holes along its length, an igniter charge disposed within said igniter tube, and flexible means for attaching said primer head and igniter tube, wherein said attachment means comprises an elastomeric tube and integral spring, said spring-reinforced tube being disposed between and attached to said primer head and igniter tube.

4. A propellant charge igniter for tank ammunition, said igniter comprising a primer head, a metallic igniter tube which is combustible and provided with a plurality of vent holes along its length, an ignite charge disposed within said igniter tube, and flexible means for attaching said primer head and igniter tube, wherein said attachment means comprises an elastomeric tube impregnated with a wire mesh, said mesh-reinforced tube being disposed between and attached to said primer head and igniter tube.

5. The invention of claim 1, 2, 3 or 4 wherein said igniter tube is aluminum.

6. The invention of claim 1, 2, 3 or 4 wherein said igniter tube is magnesium.

7. The invention of claim 1, 2, 3 or 4 wherein said primer head and igniter tube are threaded, and said flexible attachment means is provided with threaded couplings so that said primer head and igniter tube may be threaded into said flexible attachment means.

8. The invention of claim 1, 2, 3 or 4 wherein said primer head and igniter tube are bonded to said flexible attachment

9. The invention of claim 2, 3 or 4 wherein said elastomeric tube is rubber.

* * * * *